US010582009B2

(12) United States Patent
Brown et al.

(10) Patent No.: US 10,582,009 B2
(45) Date of Patent: Mar. 3, 2020

(54) METHOD AND APPARATUS FOR A CLOUD-BASED BROADBAND PUSH-TO-TALK CONFIGURATION PORTAL

(71) Applicant: MOTOROLA SOLUTIONS, INC, Chicago, IL (US)

(72) Inventors: Eric Brown, Seattle, WA (US); Alexander R. Spiro, Chicago, IL (US); Derick J. Clack, Seattle, WA (US); Zhiyi Zhou, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 300 days.

(21) Appl. No.: 15/468,226

(22) Filed: Mar. 24, 2017

(65) Prior Publication Data
US 2018/0278718 A1    Sep. 27, 2018

(51) Int. Cl.
*H04W 4/10*    (2009.01)
*H04L 29/08*    (2006.01)
(Continued)

(52) U.S. Cl.
CPC .............. *H04L 67/34* (2013.01); *H04L 67/10* (2013.01); *H04W 4/08* (2013.01); *H04W 4/10* (2013.01); *H04L 65/4061* (2013.01)

(58) Field of Classification Search
CPC ..... H04L 67/34; H04L 67/10; H04L 65/4061; H04W 4/08; H04W 4/10
(Continued)

(56) References Cited

U.S. PATENT DOCUMENTS 7,307,963 B2 * 12/2007 Chow ...................... H04L 12/66
370/259
7,529,200 B2 * 5/2009 Schmidt ............ H04L 29/06027
370/260
(Continued)

FOREIGN PATENT DOCUMENTS

WO    2016065036 A1    4/2016

OTHER PUBLICATIONS

Alfredo Callderon et al., Land Mobile Radio, May 3, 2013, IEEE Vehicular Technology Magazine, Jun. 2013, pp. 37-41.*
(Continued)

*Primary Examiner* — Hai V Nguyen
(74) *Attorney, Agent, or Firm* — Daniel R. Bestor

(57) ABSTRACT

A method for hosting a cloud-based broadband push-to-talk (PTT) configuration application includes detecting a user action taken at a remote client device providing an interface to the configuration application including an activation of an add group graphical object for adding a new group to an existing broadband PTT radio system, and further includes entrance of a unique identifier for the new group and entrance of whether the new group is a broadband-only group or a converged broadband and land-mobile-radio (LMR) group. A voice service stack associated with the broadband PTT radio system is updated to include the new group and existing other broadband mobile radios are updated via a voice service stack to reflect the added new group. Where the type of the new group is a converged broadband and LMR group, an LMR interface stack of the LMR radio system is updated to reflect the newly added group.

20 Claims, 10 Drawing Sheets

(51) Int. Cl.
*H04W 4/08* (2009.01)
*H04L 29/06* (2006.01)

(58) Field of Classification Search
USPC .......................................................... 455/518
See application file for complete search history.

(56) References Cited

U.S. PATENT DOCUMENTS

| | | | |
|---|---|---|---|
| 7,570,966 B2* | 8/2009 | Zhao | H04L 29/12122 455/518 |
| 7,684,805 B2* | 3/2010 | Zhao | H04L 29/12122 455/448 |
| 7,738,407 B2* | 6/2010 | Chow | H04W 4/10 370/259 |
| 7,738,893 B2* | 6/2010 | Lim | H04W 4/10 455/518 |
| 7,747,268 B2* | 6/2010 | Lim | H04W 4/10 455/518 |
| 7,933,225 B2* | 4/2011 | Chow | H04L 12/66 370/259 |
| 7,948,923 B2* | 5/2011 | Chow | H04W 4/10 370/259 |
| 7,948,954 B1* | 5/2011 | Chow | H04L 12/66 370/338 |
| 7,953,389 B2* | 5/2011 | Coleman | H04B 7/086 455/410 |
| 7,983,198 B2* | 7/2011 | Chow | H04W 4/10 370/259 |
| 7,990,985 B2* | 8/2011 | Chen | H04L 12/2856 370/401 |
| 8,179,820 B2* | 5/2012 | Chow | H04L 12/66 370/259 |
| 8,260,338 B2* | 9/2012 | Shaffer | H04W 4/021 455/518 |
| 8,266,422 B2* | 9/2012 | Liu | H04L 63/0485 713/151 |
| 8,335,209 B2* | 12/2012 | Van Gundy | H04L 12/1895 370/260 |
| 8,380,236 B2* | 2/2013 | Zhao | H04L 29/12122 455/519 |
| 8,385,964 B2* | 2/2013 | Haney | H04W 4/21 455/519 |
| 8,494,458 B2* | 7/2013 | Tucker | H04W 4/10 455/90.2 |
| 8,634,799 B1* | 1/2014 | Economy | H04W 48/18 455/404.1 |
| 8,750,169 B2* | 6/2014 | Chow | H04W 4/10 370/259 |
| 8,761,054 B2* | 6/2014 | Chow | H04W 4/10 370/259 |
| 8,825,063 B2* | 9/2014 | Zhao | H04L 29/12122 455/448 |
| 8,862,746 B2* | 10/2014 | Panattu | H04L 65/4061 709/227 |
| 8,886,244 B2* | 11/2014 | Miller | H04W 4/10 455/518 |
| 8,942,748 B2* | 1/2015 | Nylund | H04B 5/0006 455/404.2 |
| 8,943,182 B2* | 1/2015 | Patel | H04W 36/24 709/223 |
| 8,971,850 B2* | 3/2015 | Klein | H04W 12/06 455/411 |
| 8,982,783 B2* | 3/2015 | Miller | H04W 76/20 370/328 |
| 8,989,740 B2* | 3/2015 | Economy | H04W 48/18 455/436 |
| 9,008,607 B2* | 4/2015 | Ibbotson | H04W 24/04 455/404.1 |
| 9,042,929 B2* | 5/2015 | Kuehner | H04W 4/08 455/518 |
| 9,066,363 B2* | 6/2015 | Anderson | H04W 72/1215 |
| 9,094,827 B1* | 7/2015 | Klein | H04W 4/90 |
| 9,154,925 B2* | 10/2015 | Kerger | H04L 65/4061 |
| 9,167,392 B2* | 10/2015 | Kerger | H04L 65/4061 |
| 9,167,619 B2* | 10/2015 | Tucker | H04W 4/10 |
| 9,178,893 B2* | 11/2015 | Miller | H04L 63/104 |
| 9,232,362 B2* | 1/2016 | Bekiares | H04W 4/90 |
| 9,247,413 B1* | 1/2016 | Sahoo | H04W 48/18 |
| 9,288,639 B2* | 3/2016 | Kerger | H04L 65/4061 |
| 9,363,845 B1* | 6/2016 | Sahoo | H04L 5/001 |
| 9,374,804 B2* | 6/2016 | Chow | H04W 4/10 |
| 9,461,696 B1* | 10/2016 | Baker | H04B 1/401 |
| 9,480,096 B1* | 10/2016 | Lee | H04W 8/005 |
| 9,491,596 B2* | 11/2016 | Hammer | H04W 4/10 |
| 9,578,470 B2* | 2/2017 | Tillet | H04W 4/08 |
| 9,615,218 B2* | 4/2017 | Mazzarella | H04W 4/08 |
| 9,723,467 B2* | 8/2017 | Miller | H04W 4/90 |
| 9,743,267 B2* | 8/2017 | Schuler | H04W 8/005 |
| 9,794,761 B2* | 10/2017 | Mazzarella | H04W 4/08 |
| 10,021,539 B2* | 7/2018 | Tillet | H04B 7/18513 |
| 10,044,498 B2* | 8/2018 | Bockrath | H04L 65/00 |
| 10,051,442 B2* | 8/2018 | Proctor | G06N 5/02 |
| 10,098,132 B2* | 10/2018 | Tucker | H04W 72/10 |
| 10,178,708 B1* | 1/2019 | Gan | H04L 67/12 |
| 2003/0053434 A1* | 3/2003 | Chow | H04W 4/10 370/338 |
| 2003/0058827 A1* | 3/2003 | Chow | H04L 12/66 370/338 |
| 2005/0128997 A1* | 6/2005 | Zhao | H04L 29/12122 370/349 |
| 2006/0030344 A1* | 2/2006 | Lim | H04W 4/10 455/512 |
| 2006/0178161 A1* | 8/2006 | Jung | H04W 8/20 455/518 |
| 2006/0235981 A1* | 10/2006 | Westman | H04L 12/185 709/227 |
| 2007/0202908 A1* | 8/2007 | Shaffer | H04W 4/021 455/518 |
| 2007/0254605 A1* | 11/2007 | Zhao | H04L 29/12122 455/90.2 |
| 2007/0276947 A1* | 11/2007 | Panattu | H04L 65/4061 709/227 |
| 2007/0287474 A1* | 12/2007 | Jenkins | H04W 4/021 455/456.2 |
| 2008/0008150 A1* | 1/2008 | Chow | H04W 4/10 370/338 |
| 2008/0043690 A1* | 2/2008 | Chow | H04W 4/10 370/338 |
| 2008/0043691 A1* | 2/2008 | Chow | H04W 4/10 370/338 |
| 2008/0075055 A1* | 3/2008 | Chow | H04L 12/66 370/338 |
| 2009/0215411 A1* | 8/2009 | Tucker | H04W 4/10 455/90.2 |
| 2009/0270049 A1* | 10/2009 | Zhao | H04L 29/12122 455/90.2 |
| 2010/0082810 A1* | 4/2010 | Patel | H04W 36/24 709/225 |
| 2010/0136986 A1* | 6/2010 | Zhao | H04L 29/12122 455/448 |
| 2010/0246552 A1* | 9/2010 | Chow | H04W 4/10 370/338 |
| 2011/0194481 A1* | 8/2011 | Chow | H04L 12/66 370/312 |
| 2011/0195739 A1* | 8/2011 | Deleus | H04W 4/00 455/518 |
| 2012/0026880 A1* | 2/2012 | Miller | H04W 76/20 370/235 |
| 2013/0109425 A1* | 5/2013 | Kerger | H04L 65/4061 455/518 |
| 2013/0109426 A1* | 5/2013 | Kerger | H04L 65/4061 455/518 |
| 2013/0115995 A1* | 5/2013 | Miller | H04W 4/10 455/518 |
| 2013/0157708 A1* | 6/2013 | Economy | H04W 48/18 455/518 |
| 2013/0210475 A1* | 8/2013 | Nylund | H04B 5/0006 455/518 |

(56) References Cited

U.S. PATENT DOCUMENTS

| | | | | |
|---|---|---|---|---|
| 2013/0272134 A1* | 10/2013 | Miller | ............... | H04L 63/104 |
| | | | | 370/241 |
| 2013/0308495 A1* | 11/2013 | Tucker | ............... | H04W 4/10 |
| | | | | 370/254 |
| 2013/0337771 A1* | 12/2013 | Klein | ............... | H04W 4/90 |
| | | | | 455/411 |
| 2014/0148115 A1* | 5/2014 | Ibbotson | ............... | H04W 24/04 |
| | | | | 455/404.1 |
| 2014/0187280 A1* | 7/2014 | Bekiares | ............... | H04W 4/90 |
| | | | | 455/519 |
| 2014/0254465 A1* | 9/2014 | Chow | ............... | H04W 4/10 |
| | | | | 370/312 |
| 2015/0057040 A1* | 2/2015 | Kuehner | ............... | H04W 4/08 |
| | | | | 455/509 |
| 2015/0105042 A1* | 4/2015 | Miller | ............... | H04W 76/20 |
| | | | | 455/404.1 |
| 2015/0110005 A1* | 4/2015 | Hammer | ............... | H04W 4/10 |
| | | | | 370/329 |
| 2015/0172875 A1* | 6/2015 | Lin | ............... | H04W 4/08 |
| | | | | 455/518 |
| 2015/0201328 A1* | 7/2015 | Klein | ............... | H04W 4/90 |
| | | | | 455/404.1 |
| 2015/0281927 A1* | 10/2015 | Fiedler | ............... | H04W 4/90 |
| | | | | 455/404.2 |
| 2015/0341759 A1* | 11/2015 | Kerger | ............... | H04L 65/4061 |
| | | | | 455/26.1 |
| 2016/0135203 A1* | 5/2016 | Kim | ............... | H04W 48/20 |
| | | | | 370/315 |
| 2016/0143075 A1* | 5/2016 | Tucker | ............... | H04W 72/10 |
| | | | | 370/329 |
| 2016/0192430 A1* | 6/2016 | Sahoo | ............... | H04L 5/001 |
| | | | | 455/422.1 |
| 2016/0226937 A1* | 8/2016 | Patel | ............... | H04L 65/4061 |
| 2016/0227384 A1* | 8/2016 | Mazzarella | ............... | H04W 4/08 |
| 2016/0269876 A1* | 9/2016 | Senese | ............... | H04L 61/106 |
| 2017/0180971 A1* | 6/2017 | Schuler | ............... | H04W 8/005 |
| 2017/0201867 A1* | 7/2017 | Mazzarella | ............... | H04W 4/08 |
| 2017/0231014 A1* | 8/2017 | Patel | ............... | H04W 4/10 |
| 2017/0238152 A1* | 8/2017 | Patel | ............... | H04L 65/1069 |
| | | | | 370/312 |
| 2017/0374109 A1* | 12/2017 | Atarius | ............... | H04W 4/023 |
| 2018/0167794 A1* | 6/2018 | Gong | ............... | H04W 4/90 |
| 2018/0181656 A1* | 6/2018 | Proctor | ............... | G06N 5/022 |
| 2018/0184257 A1* | 6/2018 | Proctor | ............... | H04W 4/08 |
| 2018/0278718 A1* | 9/2018 | Brown | ............... | H04W 4/08 |
| 2018/0288599 A1* | 10/2018 | Zhao | ............... | G08B 27/001 |

OTHER PUBLICATIONS

Emil Olbrich@prinelime et al: "Event Review: LTE India 2016—Shaping Digital India Vision", Communications Today, May 27, 2016, Retrieved from the Internet: URL:http://firstnet.gema.ga.gov/Resources/Documents/IWCE%20Online%20Conference_082416_LMR%20to%20LTE.pdf [retrieved on Jun. 6, 2018], pp. 4, 7, 11, p. 22, pp. 30, 34.

"LTE; Functional architecture and information flows to support mission critical communication services; Stage 2(3GPP TS 23.179 version 13.4.0 Release 13)", ETSI Technical Specification, European Telecommunications Standards Institute (ETSI), 650, Route Des Lucioles; F-06921 Sophia-Antipois; France, vol. 3GPP SA, No. 13.4.0 Jan. 12, 2017, pp. 1-231, XP014287588, Retrieved from the Internet: URL:http://www.etsi.org/deliver/etsi ts/12 3100 123199/123179/13.04.00 -60/ts -123179v130400p.pdf [retrieved on Jan. 12, 2017], all pages.

The International Search Report and the Written Opionion, corresponding patent application No. PCT/US2018/022657 filed Mar. 15, 2018, dated Jun. 14, 2018, all pages.

* cited by examiner

METHOD AND APPARATUS FOR A CLOUD-BASED BROADBAND PUSH-TO-TALK CONFIGURATION PORTAL

BACKGROUND OF THE INVENTION

The present disclosure relates to broadband push-to-talk (PTT) configuration portal. Secure broadband PTT enables instant, real-time communication anywhere that a broadband communications link is available at any of many different types of fixed or mobile devices, including but not limited to, mobile phones, tablets, laptops, and desktop computers.

Broadband PTT systems may operate according to an industry standard protocol such as, for example, an open media alliance (OMA) push to talk (PTT) over cellular (OMA-PoC) standard, a voice over IP (VoIP) standard, or a PTT over IP (PoIP) standard, among other standardized or propriety protocols. Other types of PTT models and multimedia call models (MMCMs) are also available.

Typically, protocols such as PoC, VoIP, and PoIP are implemented over broadband RANs including third generation and fourth generation networks such as third generation partnership project (3GPP) Long Term Evolution (LTE) networks, although such protocols may alternatively or additionally operate over wired communications links with fixed computing/communications devices.

Broadband PTT systems thus enable familiar PTT and "instant on" features of traditional half duplex land mobile radio (LMR) devices, but uses mobile devices operating over more modern and higher-speed broadband telecommunications links. Accordingly, wireless mobile devices such as mobile telephones and notebook computers, using PoC, can function as PTT half-duplex mobile devices for transmitting and receiving audio and other media (such as video and text messages). Each mobile device that is a member of and configured to operate on the PTT system may be a group communications device that is normally maintained in a monitor only mode, and which switches to a transmit-only mode (for half-duplex devices) or transmit and receive mode (for full-duplex devices) upon depression or activation of a corresponding PTT input switch (e.g., a hard or soft switch). This group communications architecture allows a single one of the mobile devices to communicate with one or more group members, such as 20 other group members, associated with a particular group of mobile devices at a same time.

Floor control in a broadband PTT session such as OMA-PoC is generally maintained by a PTT server that controls communications between two or more of the mobile devices. When a user of one of the mobile devices keys a PTT button, a request for permission to speak in the OMA-PoC session is transmitted from the user's mobile device to the PTT server using, for example, a real-time transport protocol (RTP) message. If no other users are currently speaking in the PoC session, an acceptance message is transmitted back to the user's mobile device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other mobile devices in the group of mobile devices or talkgroup to which the user is subscribed), using for example, one or more of a unicast, point to multipoint, or broadcast communication technique.

Traditional on-premises deployments of broadband PTT systems require deployment, configuration, and monitoring/maintenance expertise to be deployed at each physical enterprise deployment location, preventing centralized maintenance and monitoring of system performance. It can therefore become expensive and difficult to deploy, service, and maintain such broadband PTT systems across geographically diverse locations. This becomes even more difficult and time consuming when the broadband PTT system is integrated with an LMR system.

Accordingly, there is a need for a method and apparatus for deploying a cloud-based broadband PTT configuration portal that allows a user anywhere in the world to deploy, configure, and monitor a hybrid broadband PTT and LMR integrated radio system and automatically and correspondingly configure broadband PTT and LMR radio system configurations so as to reduce configuration errors.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
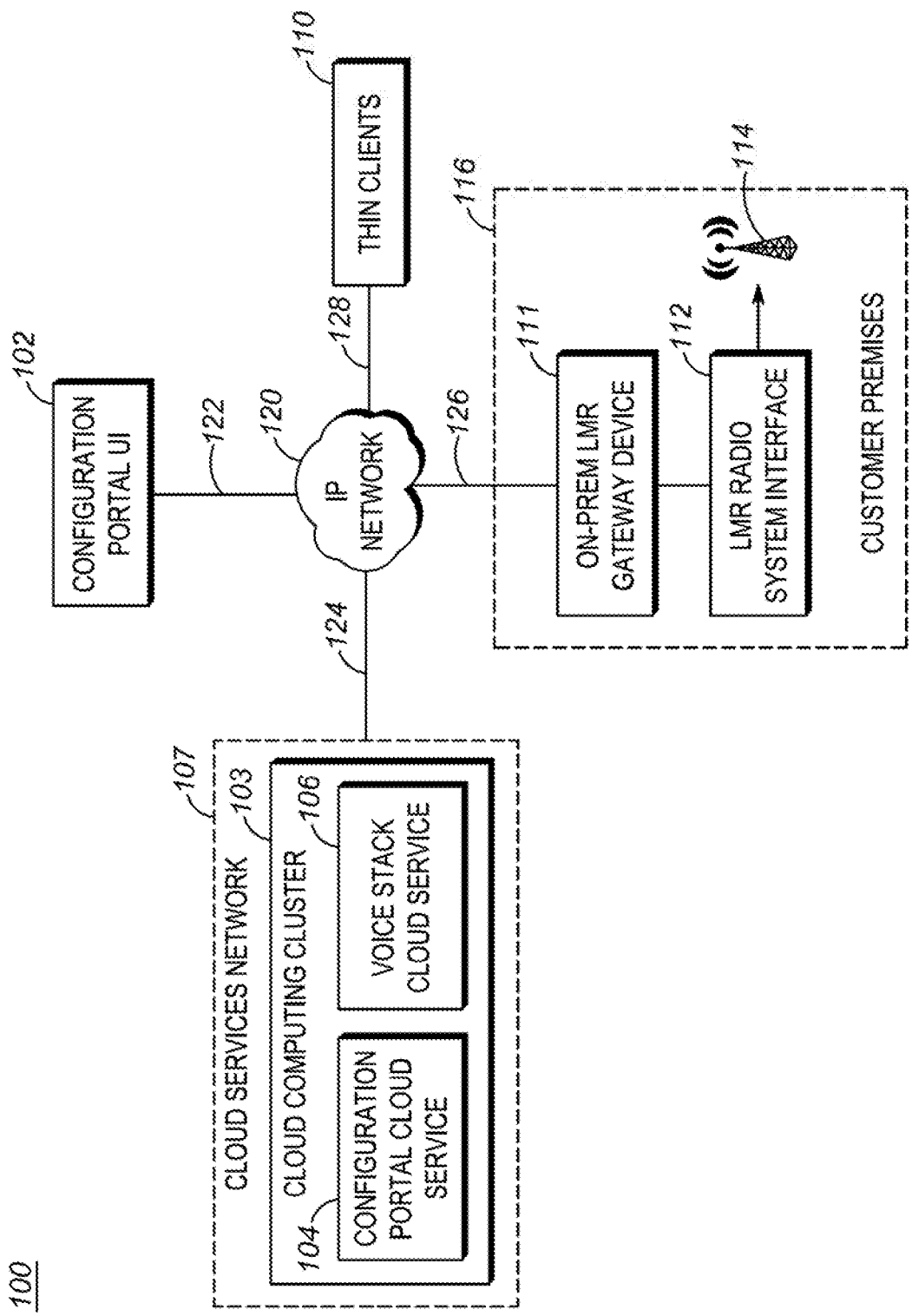
FIG. 1 is a network diagram of a system for deploying a cloud-based broadband PTT configuration portal that allows a user anywhere in the world to deploy, configure, and monitor a hybrid (broadband PTT and LMR) radio system and automatically and correspondingly configure broadband PTT and LMR radio system configurations so as to reduce configuration errors, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, apparatus, and system for deploying a cloud-based broadband push-to-talk (PTT) configuration portal that allows a user anywhere in the world to deploy, configure, and monitor a hybrid broadband PTT and land mobile radio (LMR) integrated radio system and automatically and correspondingly configure broadband PTT and LMR radio system configurations so as to reduce configuration errors.

In an exemplary embodiment, a computing device hosting a cloud-based broadband push-to-talk configuration application is configured to: detect a user action taken at a remote client device providing an interface to the cloud-based broadband push-to-talk configuration application, the user action taken including an activation of an add group graphical object associated with adding a new group to an existing broadband PTT radio system, and responsively: detect a second user action taken at the remote client device including entrance of an identifier that uniquely identifies the new group and entrance of a group type indication indicating whether the new group is a broadband-only group or a converged broadband and narrowband group; update a voice service stack associated with the broadband PTT radio system to include the new group in the particular broadband PTT radio system; update, via the voice service stack associated with the broadband PTT radio system, existing other broadband mobile radios in the broadband PTT radio system that the new group has been added to the broadband PTT radio system; and where the group type indication indicates that the new group is a converged broadband and narrowband group: register, via the voice service stack, at an LMR interface stack of a particular LMR radio system indicated via the second user action, that the new group has been added to the broadband PTT radio system.

In another exemplary embodiment, a method for hosting a cloud-based broadband push-to-talk configuration application includes: detecting, by a cloud-based broadband push-to-talk configuration application, a user action taken at a remote client device providing an interface to the cloud-based broadband push-to-talk configuration application, the user action taken including an activation of an add group graphical object associated with adding a new group to an existing broadband PTT radio system, and responsively: detecting, by the cloud-based broadband push-to-talk configuration application, a second user action taken at the remote client device including entrance of an identifier that uniquely identifies the new group and entrance of a group type indication indicating whether the new group is a broadband-only group or a converged broadband and narrowband group; updating, by the cloud-based broadband push-to-talk configuration application, a voice service stack associated with the broadband PTT radio system to include the new group in the particular broadband PTT radio system; updating, by the cloud-based broadband push-to-talk configuration application and via the voice service stack associated with the broadband PTT radio system, existing other broadband mobile radios in the broadband PTT radio system that the new group has been added to the broadband PTT radio system; and where the group type indication indicates that the new group is a converged broadband and narrowband group: registering, by the cloud-based broadband push-to-talk configuration application and via the voice service stack, at an LMR interface stack of the particular LMR radio system, that the new group has been added to the broadband PTT radio system.

Each of the above-mentioned embodiments will be discussed in more detail below, starting with example communication and device architectures of the system in which the embodiments may be practiced, followed by an illustration of processing steps and message transmission for achieving a method, device, and system for deploying a cloud-based broadband PTT configuration portal that allows a user anywhere in the world to deploy, configure, and monitor a hybrid broadband PTT and LMR integrated radio system and automatically and correspondingly configure broadband PTT and LMR radio system configurations so as to reduce configuration errors. Further advantages and features consistent with this disclosure will be set forth in the following detailed description, with reference to the figures.

1. COMMUNICATION SYSTEM AND DEVICE STRUCTURES

Referring now to the drawings, and in particular FIG. 1, a communication system diagram illustrates a system 100 of devices including a configuration portal user interface 102 running at a remote (from the cloud services network 107) underlying computing device, a cloud computing cluster 103 at a cloud services network 107, an on-premises land mobile radio (LMR) gateway device 111, an LMR radio system interface 112, an LMR radio system 114 on a customer premises 116, and a plurality of mobile device thin clients 110 that may be operating inside of our outside of the customer premises 116, all connected to one another via one or more same or separate, or partially overlapping IP network(s) 120 and corresponding IP link(s) 122, 124, 126, 128.

The configuration portal user interface 102 may be a user interface presented by a web-browser executing on an underlying computing device and directed to an internet address of the configuration portal cloud service 104 and which may run one or more internet-based program codes, including but not limited to Java, Javascript, HTML, XML, PERL, CSS, and Ruby. Additionally or alternatively the configuration portal user interface 102 may be a user interface presented via a proprietary stand-alone native code base executing on the underlying computing device that may access and communicate with the configuration portal cloud service 104, including but not limited to C++, C#, Visual Basic, and Java. Other possibilities exist as well. The underlying computing device may be a smart phone, tablet, or Personal Digital Assistant (PDA). In some embodiments, the configuration portal UI 102 may be running on one of the thin clients 110. An example of an underlying computing device that may execute the configuration portal user interface 102 is set forth in FIG. 2.

Figure 2:
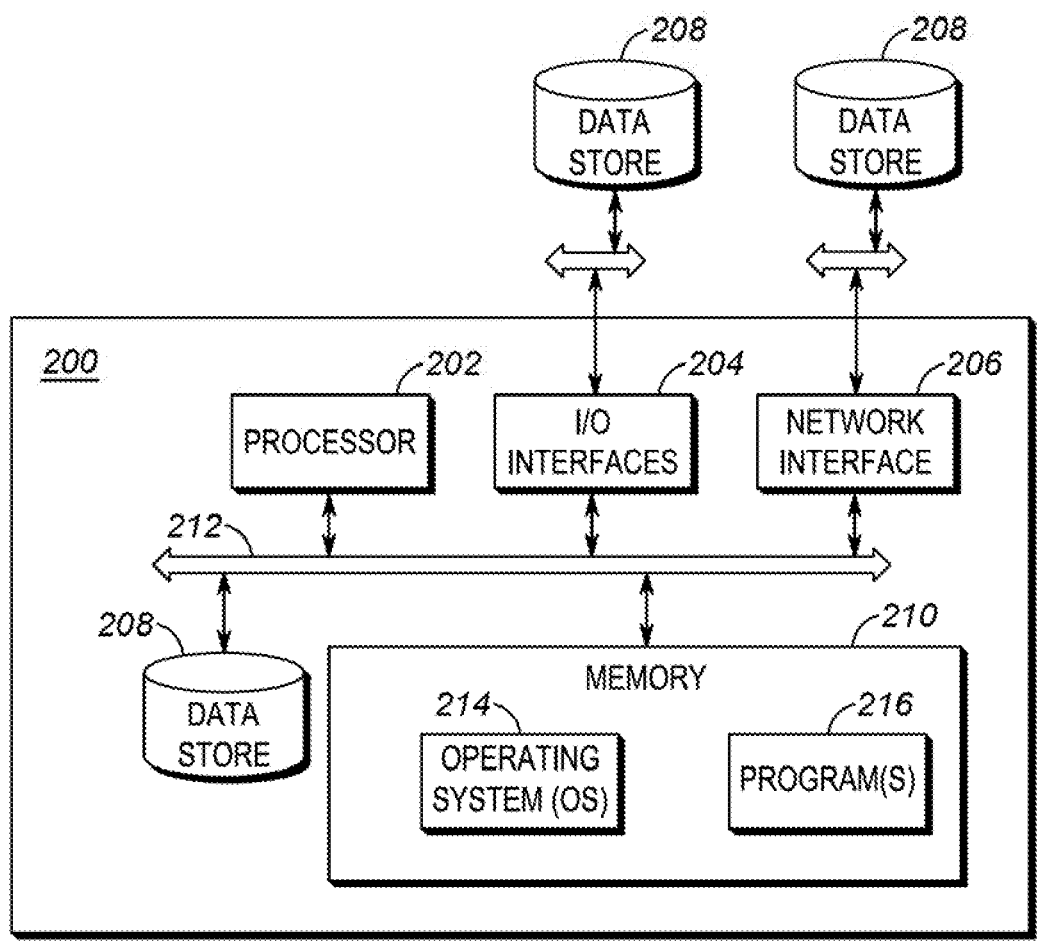
FIG. 2 is a block diagram of a cloud-based computing device, among other computing devices, which may be used, in addition to one or more additional cloud-based computing devices, for providing a configuration portal cloud service and/or voice stack cloud service, among other services, in accordance with some embodiments.

FIG. 2 is a block diagram of a computing device 200 which may be used for the cloud computing cluster 103, as the underlying computing device for the configuration portal UI 102, for the thin clients 110, or in other systems. The computing device 200 may be a digital computer that, in terms of hardware architecture, generally includes a processor 202, input/output (I/O) interfaces 204, a network interface 206, a data store 208, and a memory 210. It should be appreciated by those of ordinary skill in the art that FIG. 2 depicts the computing device 200 in a simplified manner, and a practical embodiment may include additional components and suitably configured processing logic to support known or conventional operating features that are not described in detail herein. The above-described components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the computing device 200, a semiconductor-based microprocessor (in the form of a microchip or chip set), or generally any device for executing software instructions. When the computing device 200 is in operation, the processor 202 is configured to execute software stored within the memory 210, to communicate data to and from the memory 210, and to generally control operations of the computing device 200 pursuant to the software instructions. The I/O interfaces 204 may be used to receive user input from and/or for providing system output to the user or to one or more devices or components. User input may be provided via, for example, a keyboard, touch pad, and/or a mouse. System output may be provided via a display device, speakers, and/or a printer (not shown). I/O interfaces 204 may further include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the computing device 200 to communicate on a network, such as the Internet, a wireless access network (WAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). Additionally or alternatively the network interface 206 may include a third generation partnership project (3GPP) Long Term Evolution (LTE) networks, among other possibilities. The network interface 206 may include address, control, and/or data connections to enable appropriate communications on the network.

A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the computing device 200 such as, for example, an internal hard drive connected to the local interface 212 in the computing device 200. Additionally or alternatively, the data store 208 may be located external to the computing device 200 such as, for example, an external hard drive connected to the I/O interfaces 204 (e.g., SCSI or USB connection). In a further embodiment, the data store 208 may be connected to the computing device 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Specifically, the one or more programs 216 can be configured to implement the various processes 300, 600, and/or 900 described herein.

Returning to FIG. 1, the cloud computing cluster 103 may be comprised of a plurality of computing devices, such as the one set forth in FIG. 2, one or more of which may be executing all or a portion of a configuration portal cloud service 104 and a voice stack cloud service 106, sequentially or in parallel, across the one or more computing devices. The one or more computing devices comprising the cloud computing cluster 103 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the configuration portal cloud service 104 and the voice stack cloud service 106.

The configuration portal cloud service 104 is a back-end cloud service that manages user and company account information, on-premises LMR gateway device configuration information, and allows a user at the configuration portal user interface 102 to operate a user interface provided by the configuration portal cloud service 104 to modify parameters of a broadband PTT radio system, including such things as authorized users and groups, and to modify parameters of LMR radio systems to inter-operate with the broadband PTT radio system and form a hybrid radio system.

The voice stack cloud service 106 is a backend cloud service that manages voice, text, and data communications with thin clients and with on-premises LMR gateway devices, records and distributes configuration changes, and stores all information relevant to the broadband communications system, including communications, configuration information, administration information, settings information, logging information, and authentication information.

The thin clients 110 may be any smart phone, tablet, Personal Digital Assistant (PDA), etc. that is a member of a broadband PTT radio system and wishes to participate in push-to-talk (PTT) voice communications amongst a plurality of thin clients 110 and/or LMR devices operating at the LMR radio system 114. An example structure of a thin client 111 is a same or similar computing device 200 as already set forth above with respect to FIG. 2.

On premises LMR gateway device 111 is a gateway computing device for interfacing (e.g., translating) between a conventional LMR radio system 114 via a respective LMR radio system interface 112 and the IP network 120 that couples the LMR gateway device 111 to the cloud computing cluster 103. The LMR radio system interface may be a Motorola Network Interface Services (MNIS) interface that provides interconnectivity between a MotoTrbo digital mobile radio (DMR) radio system network and the IP network 120 via the on premises LMR gateway device 111, providing services such as data over voice interruption, UDP header compression, address translation, encryption and decryption, and data throughput improvements, among others. The conventional LMR radio system 114 may be a DMR radio system, a Project 25 (P25) radio system, or a Terrestrial Trunked Radio (TETRA) radio system, among other examples. The customer premises 116 may be any geographical or physical location at which the LMR radio system 114 and corresponding LMR radios (not shown) are deployed, such as a county, a state, a region, a building, or a warehouse, among other possibilities.

2. PROCESSES FOR DEPLOYING A CLOUD-BASED BROADBAND PTT CONFIGURATION PORTAL

Figure 3:
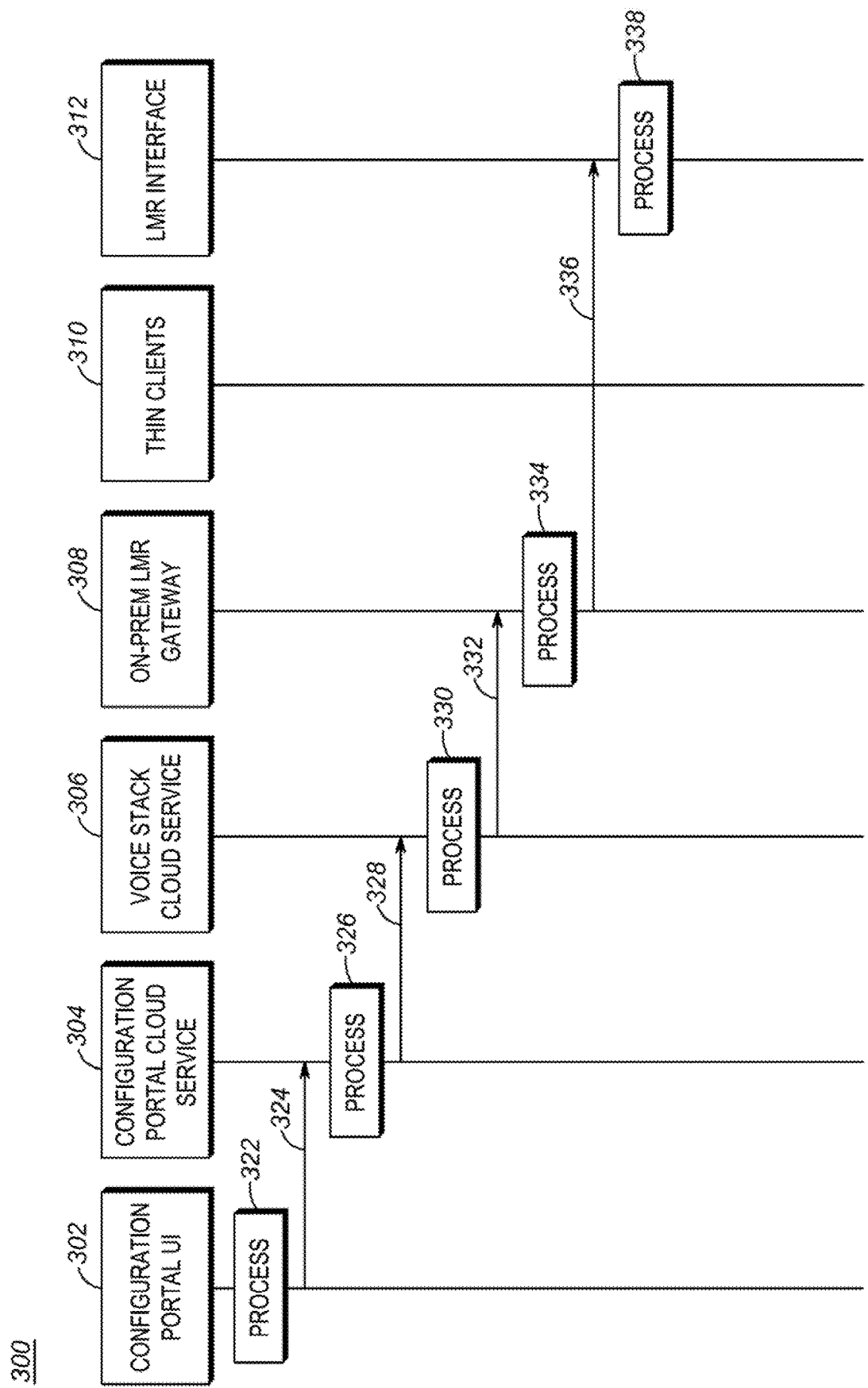
FIG. 3 is a ladder diagram illustrating processing steps and message flows in the system of FIG. 1 for adding a land-mobile radio (LMR) system to an existing broadband PTT radio system in accordance with some embodiments.
Figure 6:
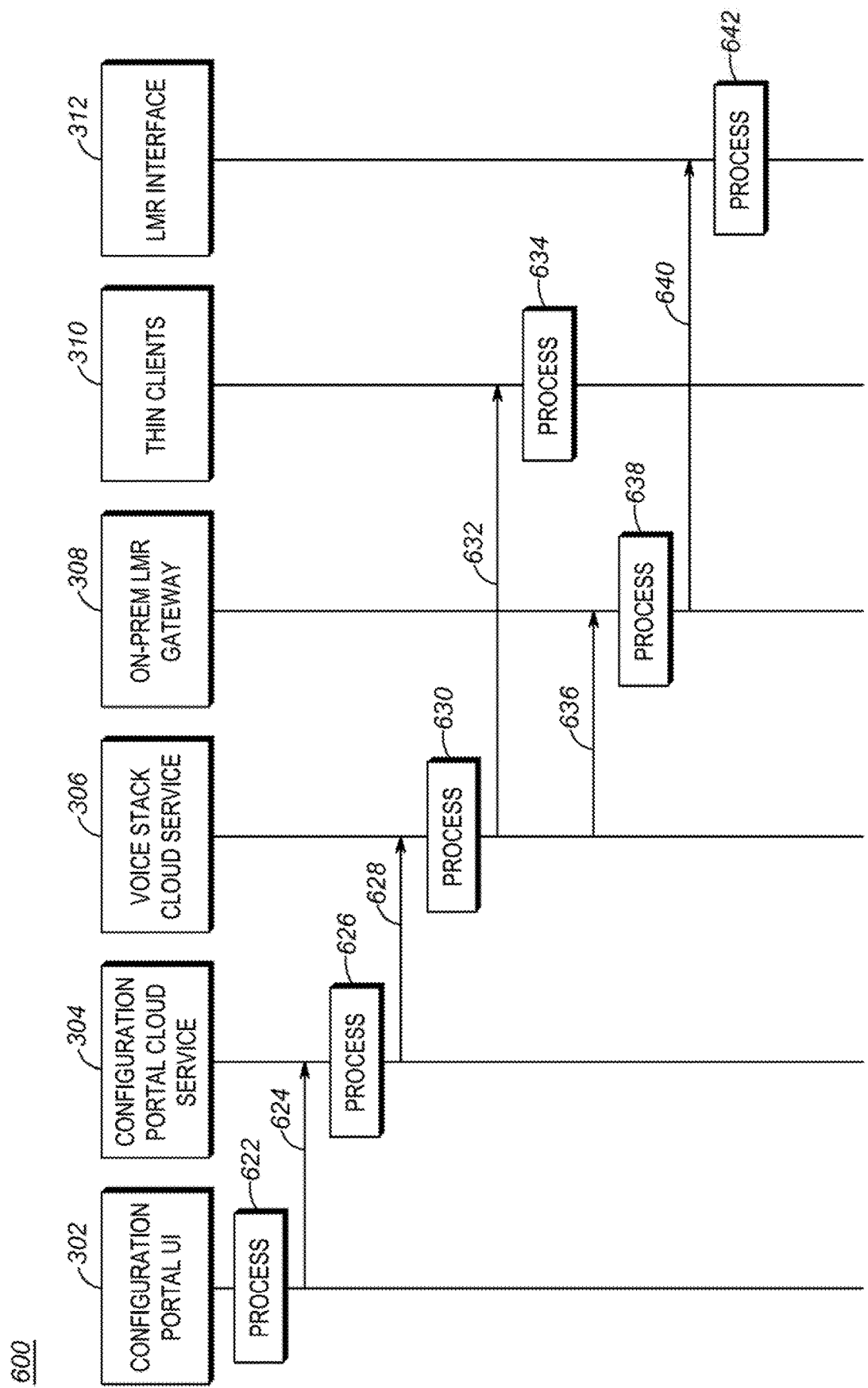
FIG. 6 is a ladder diagram illustrating processing steps and message flows in the system of FIG. 1 for adding a new group to an existing broadband PTT radio system in accordance with some embodiments.
Figure 9:
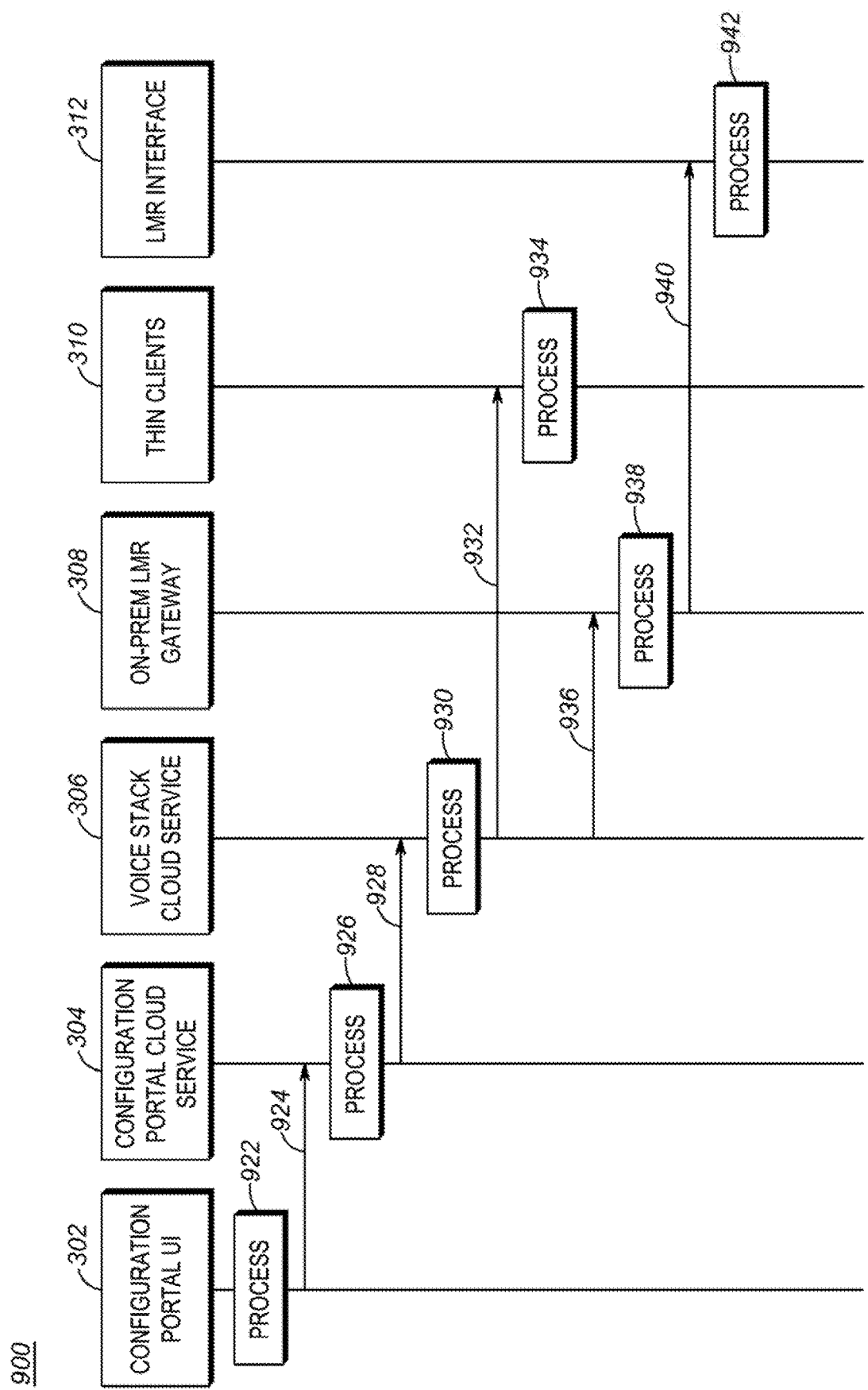
FIG. 9 is a ladder diagram illustrating processing steps and message flows in the system of FIG. 1 for adding a new user to an existing group on an existing broadband PTT radio system in accordance with some embodiments.

Turning now to FIGS. 3, 6, and 9, these figures illustrate processes for deploying a cloud-based broadband PTT configuration portal that allows a user anywhere in the world to deploy, configure, and monitor a hybrid broadband PTT and LMR integrated radio system in an intuitive manner so as to reduce configuration errors and time spent manually deploying and configuring system parameters. More particularly, a ladder diagram in FIG. 3 illustrates a process 300 by which a conventional LMR radio system is added to an existing broadband PTT radio system to create a hybrid radio system via a configuration portal user interface 302 interfacing with a configuration portal cloud service 304. A ladder diagram in FIG. 6 illustrates a process 600 by which a group is added the hybrid radio system via a configuration portal user interface 302 interfacing with a configuration portal cloud service 304. And a ladder diagram in FIG. 9 illustrates a process 900 by which a user is added to a group in the hybrid radio system via a configuration portal user interface 302 interfacing with a configuration portal cloud service 304. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure. Processes 300, 600, 900 include actions performed and/or messages transmitted or received by one or more of a configuration portal user interface 302 that may be same or similar to the configuration portal user interface 102 of FIG. 1, a configuration portal cloud service 304 that may be same or similar to the configurations portal cloud service 104 of FIG. 1, a voice stack cloud service 306 that may be same or similar to voice stack cloud service 106 of FIG. 1, on-premises LMR gateway 308 that may be same or similar to on-premises LMR gateway device 111 of FIG. 1, thin clients 310 that may be same or similar to thin clients 110 of FIG. 1, and LMR interface 312 that may be same or similar to the LMR radio system interface 112 of FIG. 1.

Figure 4:
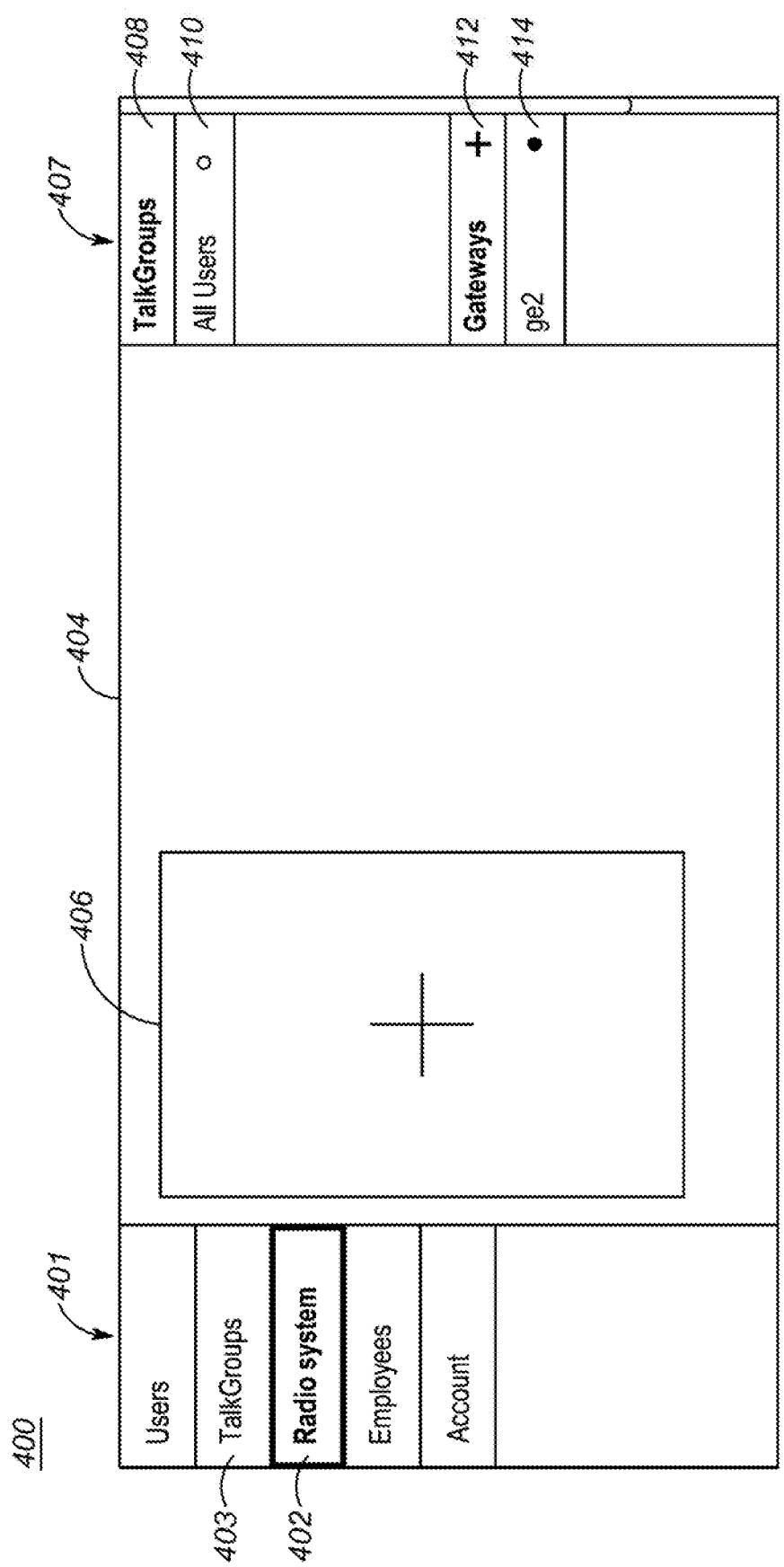
FIG. 4 is a first user interface screen capture illustrating an example user interface for adding an LMR system to an existing broadband PTT radio system via the cloud-based broadband PTT configuration portal of FIG. 1 in accordance with some embodiments.

In particular, process 300 begins at step 322 where a configuration portal user interface 302 detects user action by which a conventional LMR radio system is added to an existing broadband PTT radio system to create a hybrid radio system. FIG. 4 sets forth an example configuration portal user interface 400 that may be displayed at an underlying computing device to do so. As shown in FIG. 4, a left column 401 of selectable tabs may set forth several management tabs that will determine a content of a main screen area 404. In FIG. 4, the Radio System tab 402 is selected and the main screen area 404 is updated by the underlying computing device to display one or more LMR radio systems already added to the existing broadband PTT radio system (none currently shown in FIG. 4) along with an add LMR radio system graphical object 406 associated with adding a new LMR radio system to the existing currently broadband PTT radio system. The graphical object is any sort of visually perceptible actionable item, e.g., that a user can interact with via a mouse, touch screen, pointing device or finger in 3-D space, or some other action and/or tool. While the add LMR radio system graphical object 406 is illustrated in FIG. 4 as a graphical "plus" sign, in other embodiments, a text description such as "add radio system" or a radio system icon representative of a base station tower could be used as well. Included on a right-side column 407 of the interface 400 are selectable drop down lists of talkgroups 408, users 410, and available LMR gateway interfaces 412 (which currently lists an available "ge2" LMR gateway 414).

Figure 5:
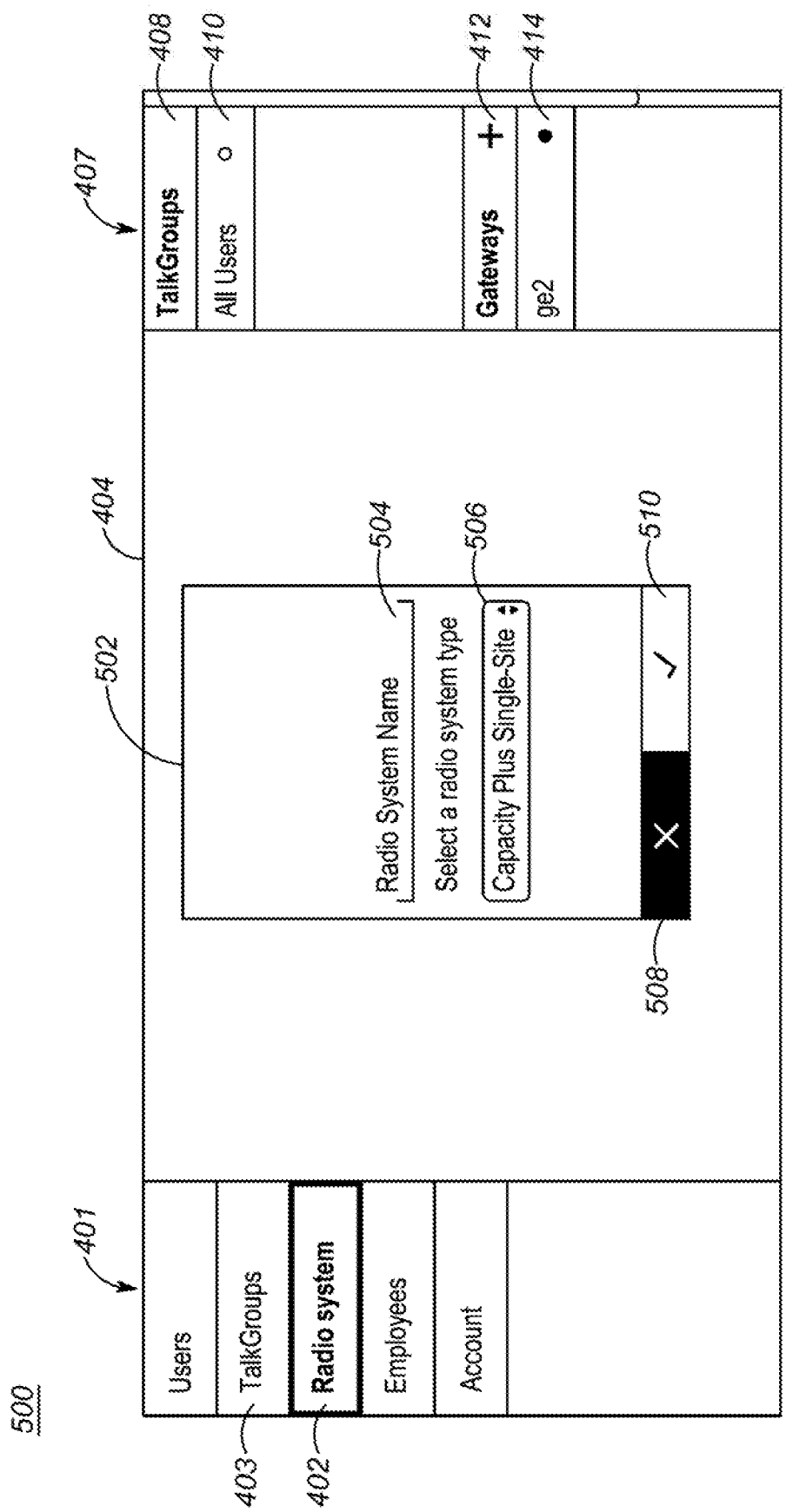
FIG. 5 is a second user interface screen capture further illustrating an example user interface for adding an LMR system to an existing broadband PTT radio system via the cloud-based broadband PTT configuration portal of FIG. 1 in accordance with some embodiments.

The configuration portal user interface 302 detecting user action, by which a conventional LMR radio system is added to an existing broadband PTT radio system to create a hybrid radio system, may thus include an underlying computing device detecting a user activation of the add LMR radio system graphical object 406. Subsequently, and as shown in FIG. 5, an additional LMR radio system graphical object 502 may then be displayed, in a further example configuration portal user interface 500, replacing, over-laying, adjacent, or partially overlapping the prior add LMR radio system graphical object 406 requesting additional information regarding the added LMR radio system, including but not limited to an alphanumeric name entry 504 and an LMR radio system type drop down box 506 to select the type of LMR radio system being added, for example, from a list including a DMR capacity plus radio system, a P25 radio system, and a TETRA radio system. A cancellation button 508 and a continue button 510 may be provided at respective regions of the additional LMR radio system graphical object 502 that respectively cancel the action of adding the LMR radio system to the existing broadband PTT radio system and continue with adding the LMR radio system to the existing broadband PTT radio system. One or more additional follow-up LMR radio system graphical objects (not shown) may additionally be displayed in one or more further configuration portal user interfaces requesting entry of further LMR radio system parameters including, but not limited to, a starting and ending range of talkgroup IDs indicating which broadband talkgroups should be made available to the LMR radio system, a starting and ending range of broadband PTT radio system identifiers indicating which broadband PTT radio system users should be made available and/or visible to the LMR radio system, private and group call hang times, privacy and/or encryption requirements, and port and IP address of an on-premises LMR gateway (e.g., 308 in this example and identified as gateway ge2 414 in FIG. 4) associated with the added LMR radio system, among other possibilities.

After sufficient information regarding the newly add LMR radio system is entered at the configuration portal user interface 302, the underlying computing device captures the information and generates and transmits a corresponding message or messages 324 to the configuration portal cloud service 304 associated with the configuration portal user interface 302.

At step 326, the configuration portal cloud service 304 receives the corresponding message or messages 324 and may validate the information received in the corresponding message or messages 324 to ensure accuracy and consistency of the parameters specified and, perhaps, that none of the information duplicates other LMR radio systems or LMR radio system parameters already existing in the broadband PTT radio system, and may also validate user account and current subscription information to ensure that the account associated with the existing broadband PTT radio system has right and license to add and integrate an LMR radio system into the existing broadband PTT radio system to create a hybrid broadband and LMR radio system. Assuming such checks pass without error, the configuration portal cloud service 304 generates and forwards some or all of the LMR radio system parameters set forth in the corresponding message or messages 324 to the voice stack cloud service 306 via one or more voice stack cloud service configuration messages 328.

At step 330, the voice stack cloud service 306 receives the one or more voice stack cloud service configuration messages 328, extracts an identity (e.g., address and accessible port) and/or configuration parameters of the on-premises LMR gateway 308 and registers the newly added LMR radio system within the voice stack cloud service so that the voice stack cloud service 306 can correctly route future voice data, presence information, user information, and/or group information to (and/or from) the LMR radio system, and then transmits an on-premises LMR gateway configuration message 332 to the on-premises LMR gateway 308 so as to bridge the LMR radio system associated with the LMR gateway 308 with the existing broadband PTT radio system. The on-premises LMR gateway 308 processes the on-premises LMR gateway configuration message 332 at step 334 and then registers itself via one or more LMR system registration messages 336 transmitted to an LMR interface 312 of the underlying added LMR radio system. The LMR interface 312 receives the one or more LMR system registration messages 336 and processes them and registers the on-premises LMR gateway 308 and corresponding parameters at step 338. During process 300, no further configuration messages are transmitted by the voice stack cloud service 306 to existing thin clients 310 of the broadband PTT radio system.

After step 326 or after step 338, the configuration portal cloud service 304 creates and causes to be displayed, at the configuration portal user interface 302, a new particular LMR radio system graphical object associated with the new LMR radio system and indicative of the new LMR radio system added to the existing broadband PTT radio system. The LMR radio system graphical object may include an indication of a number of LMR groups existing at the LMR radio system and/or a number of hybrid groups at the broadband PTT radio system that are also associated with the newly added LMR radio system and/or a number of currently active subscriber radios at the LMR radio system. Additionally or alternatively, a visual representation of the on-premises LMR gateway 308 may be provided along with a visual representation of the LMR radio system itself, with a link there between visually indicating the existence (or non-existence) of a current operating link between the two, including but not limited to an unbroken link vs. a broken link, a green check mark vs. a red 'x', and one or more other visual representations.

Moving to FIG. 6, process 600 begins at step 622 where a configuration portal user interface 302 detects user action by which a group is added to the hybrid radio system via a configuration portal user interface 302 interfacing with a configuration portal cloud service 304.

Figure 7:
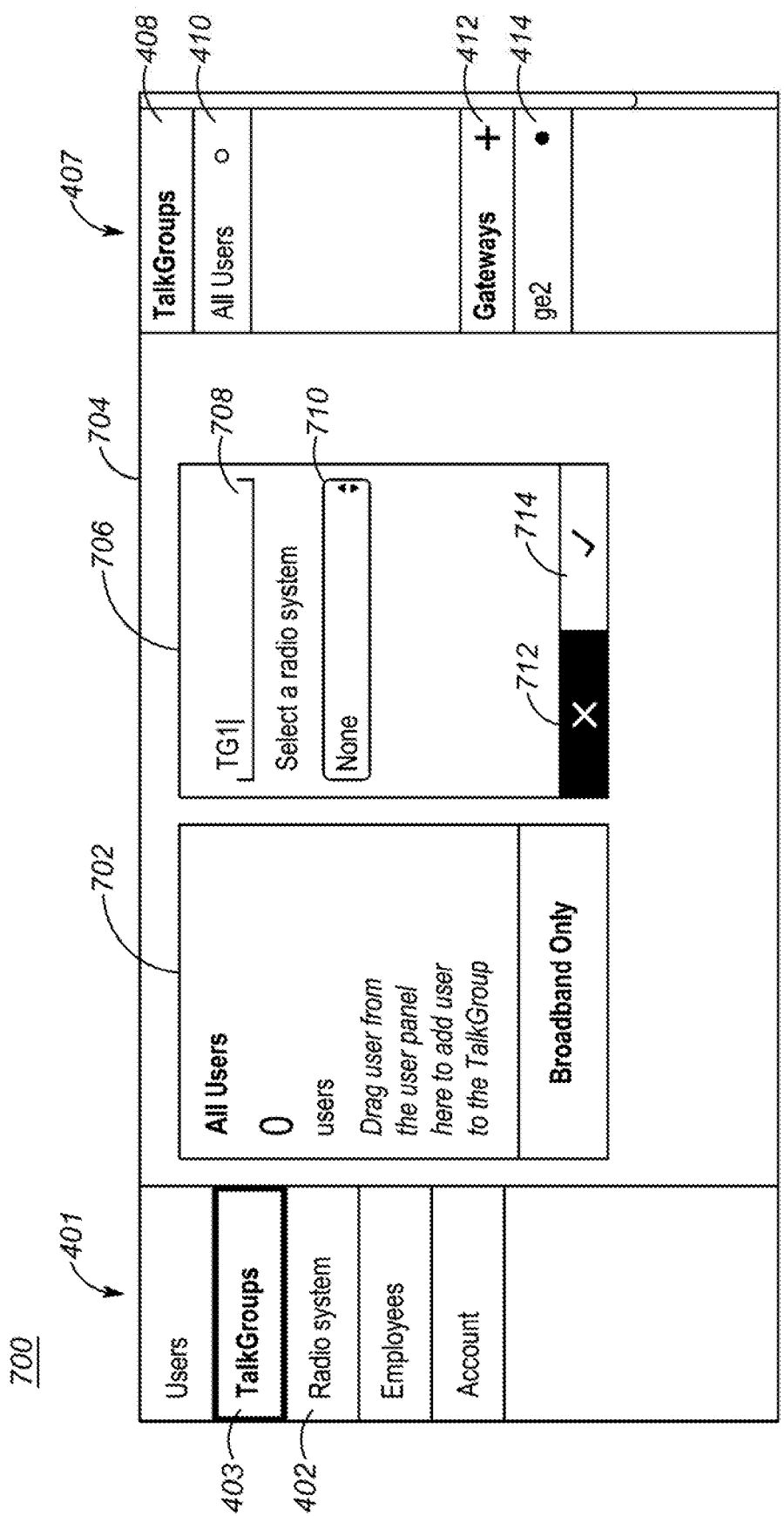
FIG. 7 is a first user interface screen capture illustrating an example user interface for adding a new group to an existing broadband PTT radio system via the cloud-based broadband PTT configuration portal of FIG. 1 in accordance with some embodiments.
Figure 8:
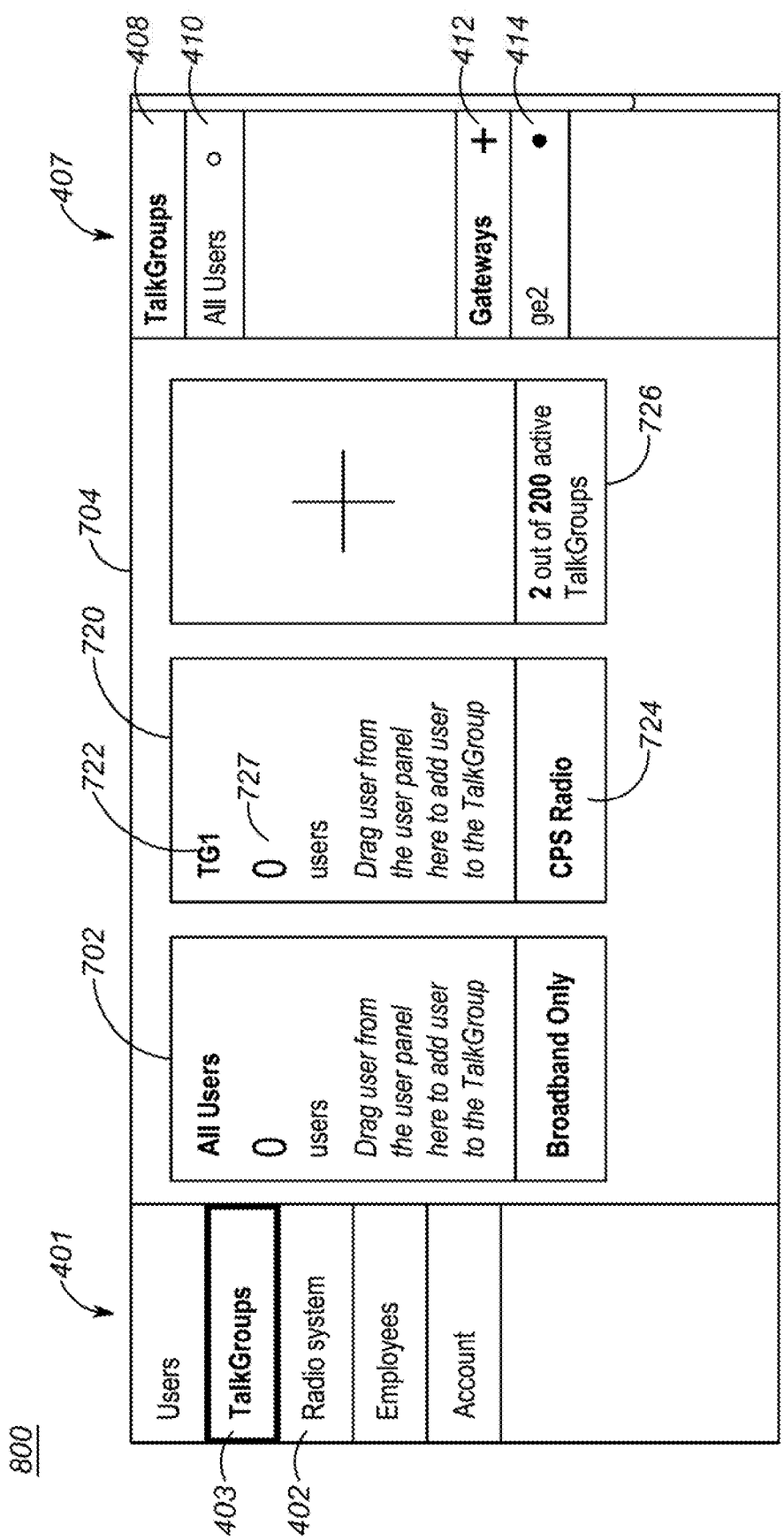
FIG. 8 is a second user interface screen capture further illustrating an example user interface for adding a new group to an existing broadband PTT radio system via the cloud-based broadband PTT configuration portal of FIG. 1 in accordance with some embodiments.

FIG. 7 sets forth an example configuration portal user interface 700 that may be displayed at an underlying computing device. As shown in FIG. 7, the talkgroups tab 403 is selected in the left column 401 and the main screen area 704 is updated by the underlying computing device to display one or more groups already added to the existing broadband PTT radio system (which may or may not include a default "all users" groups as shown in FIG. 7) along with an add group graphical object associated with adding a new group to the existing broadband PTT radio system. The add group graphical object, while not illustrated in FIG. 7, may reflect a similar graphical "plus" sign as the add radio system graphical object or, in other embodiments, a text description such as "add group" or a "group" icon representative of a group of radios could be used as well. An example of an add group graphical object 726 is shown in FIG. 8.

The configuration portal user interface 302 detecting user action, by which a group is added to an existing broadband PTT radio system, may thus include detecting a user activation of an add group graphical object (not shown in FIG. 7). In the example of FIG. 7, it is assumed that an add group graphical object (perhaps same or similar to the add group graphical object 726 of FIG. 8) underlying or preceding the additional group information graphical object 706 was activated, causing the additional group information graphical object 706 to be displayed replacing, over-laying, adjacent, or partially overlapping the prior add group graphical object requesting additional information regarding the added group, including an alphanumeric name entry 708 and an LMR radio system type drop down box 710 to leave blank if the added group is to be broadband PTT radio system only, or to select via a drop-down list of previously-added LMR radio systems if the added group is to be a hybrid broadband and LMR radio system group accessible over and including one or more radios in both the broadband PTT radio system (e.g. thin clients 310) and one or more radios in the LMR radio system accessible via an LMR interface 312.

A cancellation button 712 and a continue button 714 may be provided at respective regions of the additional group information graphical object 706 that respectively cancel the action of adding the group to the existing broadband PTT radio system and continue with adding the group to the existing broadband PTT radio system. One or more additional follow-up group graphical objects (not shown) may additionally be displayed in one or more further configuration portal user interfaces requesting entry of further group parameters including, but not limited to, a unique numerical or alphanumeric talkgroup identifier for the newly added group.

After sufficient information regarding the newly added group is entered at the configuration portal user interface 302, the underlying computing device captures the information and generates and transmits a corresponding message or messages 624 to the configuration portal cloud service 304 associated with the configuration portal user interface 302.

At step 626, the configuration portal cloud service 304 receives the corresponding message or messages 624 and may validate the information received in the corresponding message or messages 624 to ensure accuracy and consistency of the parameters specified and, perhaps, that none of the information duplicates other group parameters already existing in the broadband PTT radio system, and may also validate user account and current subscription information to ensure that the account associated with the existing broadband PTT radio system has right and license to add broadband and/or hybrid groups into the existing broadband PTT radio system. Assuming such checks pass without error, the configuration portal cloud service 304 generates and forwards some or all of the group parameters set forth in the corresponding message or messages 624 to the voice stack cloud service 306 via one or more voice stack cloud service configuration messages 628.

At step 630, the voice stack cloud service 306 receives the one or more voice stack cloud service configuration messages 628, extracts an identity (e.g., group name and/or group identifier) of the newly added group and registers the newly added group within the voice stack cloud service 306 so that the voice stack cloud service 306 can correctly route future voice data, presence information, user information, and/or group information among subsequently added members of the group in the broadband and/or the LMR radio system(s) associated with the group. Also at step 630, the voice stack cloud service 306 generates and transmits a thin client configuration message 632 containing group configuration information (e.g., such as the group name and group identifier, and in some embodiments whether the group is a broadband-only group or a hybrid group) to the thin clients 310 that are members of the broadband PTT radio system so as to inform them and allow users thereof (after processing at step 634) to select and utilize the newly added group via a user interface of the respective thin clients 310.

Still at step 630, and assuming that the newly added group is a hybrid group (and not a broadband-only group), the voice stack cloud service 306 also generates and transmits an on-premises LMR gateway configuration message 636 to the on-premises LMR gateway 308 containing group configuration information (e.g., such as the group name and/or group identifier, and in some embodiments that the group is a a hybrid group) so as to inform the on-premises LMR gateway 308 of the newly added group.

The on-premises LMR gateway 308 processes the on-premises LMR gateway configuration message 636 at step 638 and then registers the newly added group via one or more LMR system registration messages 640 transmitted to an LMR interface 312 of the underlying added LMR radio system. The LMR interface 312 receives the one or more LMR system registration messages 640 and correspondingly propagates the changes through to LMR radios at the LMR radio system.

After step 626 or after step 642, the configuration portal cloud service 304 creates and causes to be displayed, at the configuration portal user interface 302, a new particular group graphical object associated with the new group and indicative of the new group added to the existing broadband PTT radio system. As illustrated in example configuration portal user interface 800, the main screen area 704 is updated to include a new particular group graphical object 720 that includes the provided talkgroup name 722 and indicates that the group is a hybrid group by visually indicating the LMR radio system 724 associated with the new group. Although only one LMR radio system 724 visual graphical object is illustrated in FIG. 8, in other embodiments, the added group may be associated with more than one LMR radio system and the new particular group graphical object 720 may be modified to so reflect it. Furthermore, the new particular group graphical object 720 may include a number of users 727 graphical object that indicates a current number of users currently added to the group (in this case, since it is newly added, it reflects 0 current users). Of course, other ways of indicating hybrid groups could be used, including visual indications of an LMR base station tower or some other icon visually represented on or in the new particular group graphical object 720, and in other embodiments, other types of information could be provided via the new particular group graphical object 720, including but not limited to the talkgroup ID associated with the newly added talkgroup, among other possibilities.

Moving to FIG. 9, process 900 begins at step 922 where a configuration portal user interface 302 detects user action by which a user is added to a group via a configuration portal user interface 302 interfacing with a configuration portal cloud service 304.

Figure 10:
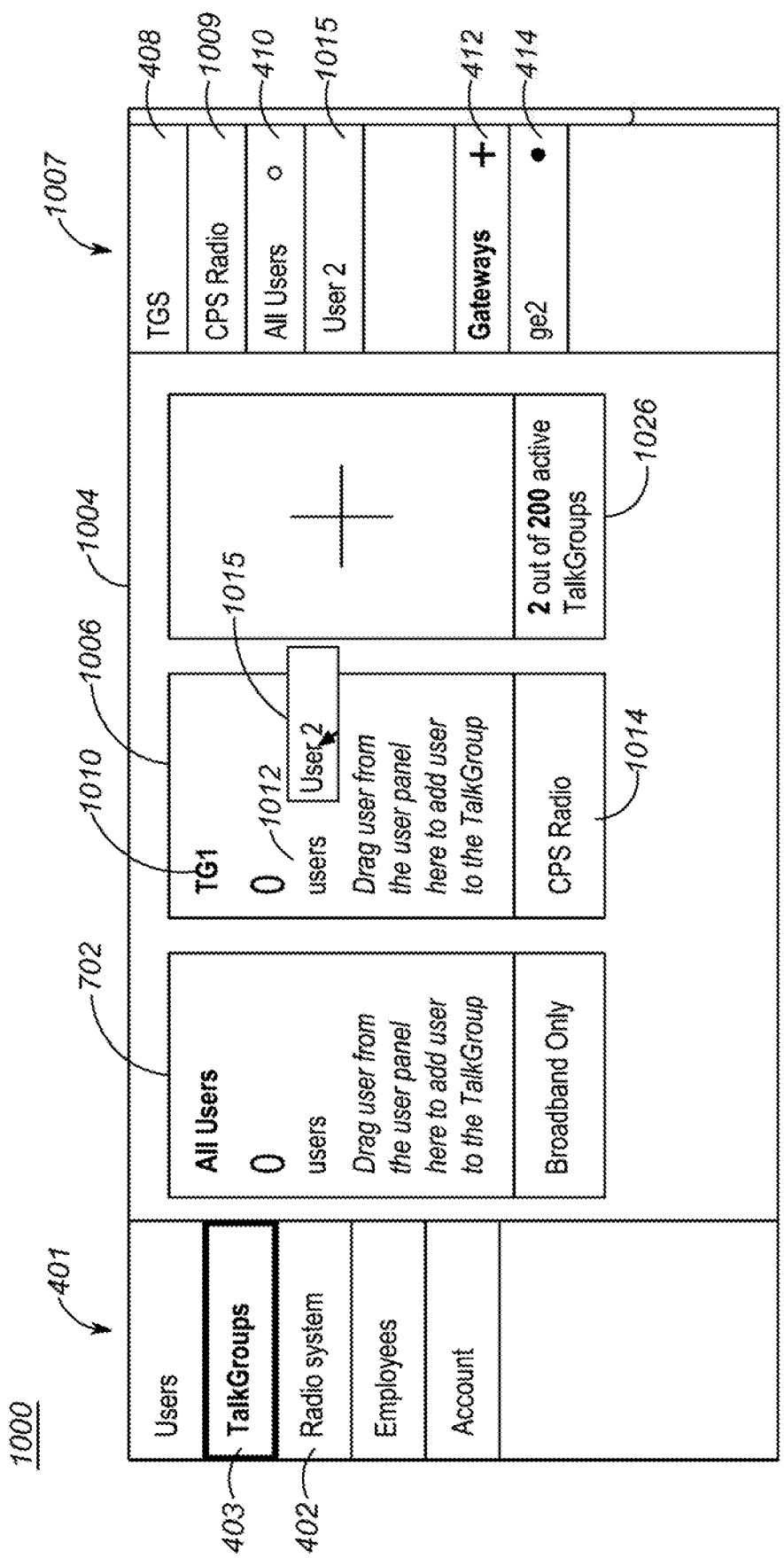
FIG. 10 is a user interface screen capture illustrating an example user interface for adding a new user to a new group on an existing broadband PTT radio system via the cloud-based broadband PTT configuration portal of FIG. 1 in accordance with some embodiments.

FIG. 10 sets forth an example configuration portal user interface 1000 that may be displayed at an underlying computing device. As shown in FIG. 10, the talkgroups tab 403 is selected in the left column 401 and the main screen area 1004 is updated by the underlying computing device to display one or more groups already added to the existing broadband PTT radio system (only the default "all users" group graphical object 702 and the TG1 hybrid group graphical object 1006 created via the process 600 of FIG. 6 is currently shown in FIG. 10, accordingly illustrating 0 users 1012, illustrating the name TG1 1010, and illustrating an indication of the CPS Radio system 1014 LMR radio system that was added to the group, and which is also indicated in the right hand column 1007 as CPS Radio group graphical object 1009) along with an add group graphical object 1026 associated with adding another new group to the existing broadband PTT radio system.

The configuration portal user interface 302 detecting user action, by which a user is added to an existing group in the broadband PTT radio system, may include detecting a user selection of a particular user "user 2" graphical object 1015 from the right column 1007 associated with a user previously added to the broadband system and associated with a particular subscriber radio (broadband thin client or LMR subscriber radio) of the example configuration portal user interface 1000 and a dragging and dropping of the "user 2" graphical object 1015 onto the TG1 hybrid group graphical object 1006. The input mechanism to perform the selection, dragging, and dropping of the "user 2" graphical object 1015 associated with a thin client or subscriber radio may be provided by a mouse, a touch screen, a pointing device or finger in 3-D space, or some other action and/or tool.

In some embodiments, no confirmation box may be raised as a result of the dragging and dropping, while in other embodiments, a confirmation box may be raised asking the user at the configuration portal user interface 302 to confirm that the "user 2" subscriber radio represented by the "user 2" graphical object 1015 should be added to the TG1 group. A cancellation button and a confirmation button may be provided at respective regions of the confirmation box that respectively cancel the action of adding the user to the existing group and continue with adding the user to the existing group. One or more additional follow-up user graphical objects (not shown) may additionally be displayed in one or more further configuration portal user interfaces requesting entry of further user or group parameters including, but not limited to, a unique numerical or alphanumeric user identifier, a time and/or days for which the user should be included in the group, and/or other limitations associated with the added user.

After sufficient additional information, if any, regarding the newly added user is entered at the configuration portal user interface 302, the underlying computing device captures the information and generates and transmits a corresponding message or messages 924 to the configuration portal cloud service 304 associated with the configuration portal user interface 302.

At step 926, the configuration portal cloud service 304 receives the corresponding message or messages 924 and may validate the information received in the corresponding message or messages 924 to ensure accuracy and consistency of the parameters specified and, perhaps, that none of the information duplicates other user parameters already existing in the broadband PTT radio system, and may also validate user account and current subscription information to ensure that the account associated with the existing broadband PTT radio system has right and license to add broadband and/or hybrid users into groups of the existing broadband PTT radio system. Assuming such checks pass without error, the configuration portal cloud service 304 generates and forwards some or all of the user and group identification and additional information parameters set forth in the corresponding message or messages 924 to the voice stack cloud service 306 via one or more voice stack cloud service configuration messages 928.

At step 930, the voice stack cloud service 306 receives the one or more voice stack cloud service configuration messages 928, extracts an identity (e.g., group name and/or group identifier of the group to which the new user was added and user name and/or user identifier of the newly added user) and registers the newly added user within the voice stack cloud service 306 so that the voice stack cloud service 306 can correctly route future voice data, presence information, user information, and/or group information targeting the user or group to which the user has been added via the broadband and/or the LMR radio system(s) associated with the group (in this case, to both as the TG1 group is a hybrid group, but in other embodiments where the TG1 group were a broadband-only group, only via the broadband PTT radio system). Also at step 930, the voice stack cloud service 306 generates and transmits a thin client configuration message 932 containing user configuration information (e.g., such as the name and/or identifier associated with the newly added user and/or including an identity of the group to which the user was added) to the thin clients 310 that are members of the broadband PTT radio system so as to inform them and allow (after processing at step 934) them to reflect the correct membership of the group to which the new user was added.

Still at step 930, and assuming that the newly added group is a hybrid group (and not a broadband-only group), the voice stack cloud service 306 also generates and transmits an on-premises LMR gateway configuration message 936 to the on-premises LMR gateway 308 containing user configuration information (e.g., such as the user name and/or user identifier, and in some embodiments the identity of the group to which the new user was added) so as to inform the on-premises LMR gateway 308 of the newly added user so that the LMR subscriber radios may correctly reflect the membership of the group.

The on-premises LMR gateway 308 processes the on-premises LMR gateway configuration message 936 at step 938 and then registers the newly added user via one or more LMR system registration messages 940 transmitted to an LMR interface 312 of the underlying added LMR radio system. The LMR interface 312 receives the one or more LMR system registration messages 940 and correspondingly propagates the changes through to LMR subscriber radios at the LMR radio system.

After step 926 or after step 942, the configuration portal cloud service 304 creates and causes to be displayed, at the configuration portal user interface 302, an updated particular group graphical object associated with the group to which the new user was added indicative of the increase in number of users in the group. For example, the number of users indicator 1012 TG1 of the hybrid group graphical object 1006 could be incremented from 0 to 1 to reflect the addition of "user 2" to the TG1 group.

3. CONCLUSION

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A cloud computing device hosting a voice stack cloud service for routing voice communications between broadband mobile radios operating via a broadband push-to-talk (PTT) radio system and land mobile radio (LMR) devices operating via one or more LMR radio systems and hosting a cloud-based broadband PTT configuration application for allowing remote configuration of the voice stack cloud service, the cloud computing device configured to:
   detect, via the broadband PTT configuration application, a first user action taken at a remote client device providing an interface to the cloud-based broadband push-to-talk configuration application, the first user action taken including an activation of an add group graphical object associated with adding a new group to an existing broadband PTT radio system;
   detect, via the broadband PTT configuration application, a second user action taken at the remote client device including entrance of an identifier that uniquely identifies the new group and entrance of a group type indication indicating whether the new group is a broadband-only group or a converged broadband and LMR group, and responsive to detecting the first and second user action:
      where the group type indication indicates that the new group is a broadband-only group:
         update, by the broadband PTT configuration application, the voice stack cloud service associated with the broadband PTT radio system to include the new group in the broadband PTT radio system;
         update, by the broadband PTT configuration application and via the voice stack cloud service associated with the broadband PTT radio system, existing other broadband mobile radios in the broadband PTT radio system that the new group has been added to the broadband PTT radio system; and
      where the group type indication indicates that the new group is a converged broadband and LMR group:
         update, by the broadband PTT configuration application, the voice stack cloud service associated with the broadband PTT radio system to include the new group in the broadband PTT radio system;
         update, by the broadband PTT configuration application and via the voice stack cloud service associated with the broadband PTT radio system, existing other broadband mobile radios in the broadband PTT radio system that the new group has been added to the broadband PTT radio system; and
         register, by the broadband PTT configuration application via the voice stack cloud service, at a particular LMR radio system indicated via the second user action, that the new group has been added to the broadband PTT radio system; and
   route, via the updated voice stack cloud service, subsequently received voice communications between broadband mobile radios operating via the broadband PTT radio system and/or LMR devices operating via one or more LMR radio systems.

2. The cloud computing device of claim 1, wherein the particular LMR radio system is one of a ETSI Digital Mobile Radio (DMR) radio system, a Project 25 (P25) radio system, and a Terrestrial Trunked Radio (TETRA) radio system.

3. The cloud computing device of claim 1, wherein the cloud computing device is further configured to register the new group at the particular LMR radio system by transmitting a registration message to an on-premises gateway device disposed at a same location as the particular LMR radio system and having a hardware address associated with the particular LMR radio system stored at the cloud-based broadband push-to-talk configuration application.

4. The cloud computing device of claim 1, wherein the cloud computing device is further configured to:

create and cause to be displayed, at the remote client device, a new particular group graphical object associated with the new group and indicative of the new group added to the existing broadband PTT radio system and a visual indication that the new group is the converged broadband and LMR group.

5. The cloud computing device of claim 4, wherein the visual indication is text displayed on, over, or in the new particular group graphical object identifying the particular LMR radio system.

6. The cloud computing device of claim 4, wherein the visual indication is an icon associated with an LMR radio system.

7. The cloud computing device of claim 4, wherein the cloud computing device is further configured to:
   detect a third user action taken at the remote client device providing an interface to the cloud-based broadband push-to-talk configuration application, the third user action taken including a selection of a particular radio system user graphical object associated with a particular radio system user and a dragging and dropping of the particular radio system user graphical object to the new particular group graphical object associated with the new group, and responsively:
   update the voice stack cloud service associated with the broadband PTT radio system to include the particular radio system user in group audio and presence information routing with respect to the new group;
   update, via the voice stack cloud service associated with the broadband PTT radio system, existing other broadband mobile radios in the new group that the particular radio system user has been added to the new group; and
   where the group type indication indicates that the new group is a converged broadband and LMR group:
      update, via the voice stack cloud service, the particular LMR radio system that the particular radio system user has been added to the new group.

8. The cloud computing device of claim 7, wherein the cloud computing device is further configured to:
   modify the new particular group graphical object associated with the new group to provide an updated visual indication that the particular radio system user has been added to the new group.

9. The cloud computing device of claim 8, wherein the updated visual indication that the particular radio system user has been added to the new group comprises an increment in a numerical number of users displayed in or on the new particular group graphical object.

10. A method for hosting, by a cloud computing device, a voice stack cloud service for routing voice communications between broadband mobile radios operating via a broadband push-to-talk (PTT) radio system and land mobile radio (LMR) devices operating via one or more LMR radio systems and hosting, by the cloud computing device, a cloud-based broadband PTT configuration application for allowing remote configuration of the voice stack cloud service, the method comprising:
   detecting, by the cloud-based broadband push-to-talk configuration application, a first user action taken at a remote client device providing an interface to the cloud-based broadband push-to-talk configuration application, the first user action taken including an activation of an add group graphical object associated with adding a new group to an existing broadband PTT radio system;
   detecting, by the cloud-based broadband push-to-talk configuration application, a second user action taken at the remote client device including entrance of an identifier that uniquely identifies the new group and entrance of a group type indication indicating whether the new group is a broadband-only group or a converged broadband and LMR group, and responsive to detecting the first and second user action:
      where the group type indication indicates that the new group is a broadband-only group:
         updating, by the cloud-based broadband push-to-talk configuration application, the voice stack cloud service associated with the broadband PTT radio system to include the new group in the existing broadband PTT radio system;
         updating, by the cloud-based broadband push-to-talk configuration application, and via the voice stack cloud service associated with the broadband PTT radio system, existing other broadband mobile radios in the broadband PTT radio system that the new group has been added to the broadband PTT radio system; and
      where the group type indication indicates that the new group is a converged broadband and LMR group:
         updating, by the cloud-based broadband push-to-talk configuration application, the voice stack cloud service associated with the broadband PTT radio system to include the new group in the existing broadband PTT radio system;
         updating, by the cloud-based broadband push-to-talk configuration application and via the voice stack cloud service associated with the broadband PTT radio system, existing other broadband mobile radios in the broadband PTT radio system that the new group has been added to the broadband PTT radio system; and
         registering, by the cloud-based broadband push-to-talk configuration application and via the voice stack cloud service, at a particular LMR radio system indicated via the second user action, that the new group has been added to the broadband PTT radio system; and
   routing, by the voice stack cloud service, subsequently received voice communications between broadband mobile radios operating via the broadband PTT radio system and/or LMR devices operating via one or more LMR radio systems in accordance with the updated voice stack cloud service.

11. The method of claim 10, wherein the particular LMR radio system is one of an ETSI Digital Mobile Radio (DMR) radio system, a Project 25 (P25) radio system, and a Terrestrial Trunked Radio (TETRA) radio system.

12. The method of claim 10, further comprising registering, by the cloud-based broadband push-to-talk configuration application, the new group at the particular LMR radio system by transmitting a registration message to an on-premises gateway device disposed at a same location as the particular LMR radio system and having a hardware address associated with the particular LMR radio system stored at the cloud-based broadband push-to-talk configuration application.

13. The method of claim 10, the method further comprising:
   creating and causing to be displayed, by the cloud-based broadband push-to-talk configuration application at the remote client device, a new particular group graphical object associated with the new group and indicative of the new group added to the existing broadband PTT radio system and a visual indication that the new group is the converged broadband and LMR group.

14. The method of claim 13, wherein the visual indication is text displayed on, over, or in the new particular group graphical object identifying the particular LMR radio system.

15. The method of claim 13, wherein the visual indication is an icon associated with an LMR radio system.

16. The method of claim 13, the method further comprising:
   detecting, by the cloud-based broadband push-to-talk configuration application, a third user action taken at the remote client device providing an interface to the cloud-based broadband push-to-talk configuration application, the third user action taken including a selection of a particular radio system user graphical object associated with a particular radio system user and a dragging and dropping of the particular radio system user graphical object to the new particular group graphical object associated with the new group, and responsively:
      updating, by the cloud-based broadband push-to-talk configuration application, the voice stack cloud service associated with the broadband PTT radio system to include the particular radio system user in group audio and presence information routing with respect to the new group;
      updating, by the cloud-based broadband push-to-talk configuration application via the voice stack cloud service associated with the broadband PTT radio system, existing other broadband mobile radios in the new group that the particular radio system user has been added to the new group; and
      where the group type indication indicates that the new group is a converged broadband and LMR group:
         updating, by the cloud-based broadband push-to-talk configuration application via the voice stack cloud service, the particular LMR radio system that the particular radio system user has been added to the new group.

17. The method of claim 16, the method further comprising:
   modifying, by the cloud-based broadband push-to-talk configuration application, the new particular group graphical object associated with the new group to provide an updated visual indication that the particular radio system user has been added to the new group.

18. The method of claim 17, wherein the updated visual indication that the particular radio system user has been added to the new group comprises an increment in a numerical number of users displayed in or on the new particular group graphical object.

19. The method of claim 10, further comprising:
   detecting, by the cloud-based broadband push-to-talk configuration application, a third user action taken at the remote client device providing an interface to the cloud-based broadband push-to-talk configuration application, the third user action taken including an activation of an LMR radio system graphical object associated with adding a new LMR radio system to the existing broadband PTT radio system, and responsively:
      detecting, by the cloud-based broadband push-to-talk configuration application, a fourth user action taken at the remote client device including entrance of LMR radio system parameters indicating a type of the new LMR radio system and one or more operational parameters thereof;
      updating, by the cloud-based broadband push-to-talk configuration application, the voice stack cloud service associated with the broadband PTT radio system to include the new LMR radio system as a further extension of the existing broadband PTT radio system;
      registering, by the cloud-based broadband push-to-talk configuration application via the voice stack cloud service, at the new LMR radio system, that the new LMR radio system has been added as a further extension to the existing broadband PTT radio system; and
      creating, by the cloud-based broadband push-to-talk configuration application, and causing to be displayed at the remote client device, a new LMR radio system graphical object indicative of the added new LMR radio system to the existing broadband PTT radio system.

20. The method of claim 19, further comprising:
   adding the new LMR radio system as an option to select one or more LMR radio systems when adding a new converged group to the existing broadband PTT radio system.

* * * * *